P. A. TREPIER.
LOCKING WASHER.
APPLICATION FILED MAR. 31, 1920.

1,425,725.

Patented Aug. 15, 1922.

UNITED STATES PATENT OFFICE.

PAUL AIMÉ TREPIER, OF PARIS, FRANCE.

LOCKING WASHER.

1,425,725.          Specification of Letters Patent.    Patented Aug. 15, 1922.

Application filed March 31, 1920. Serial No. 370,311.

*To all whom it may concern:*

Be it known that I, PAUL AIMÉ TREPIER, a citizen of the Republic of France, residing in Paris, France, have invented new and useful Improvements in or Relating to Locking Washers, of which the following is a specification.

This invention relates to locking washers for preventing a nut or the like from becoming loose or unscrewed.

An object of the invention is to provide a powerful flexible spring washer which can be used in a relatively small space, and which will hold two objects in the desired positions under intense vibration.

Another object is to provide a series of elastic plates in juxtaposed relation and secured together to form a powerful washer, and in order to be manipulated as a single unit.

Other objects and advantages of the invention will be apparent during the course of the following description.

In the accompanying drawing forming a part of this specification, in which like numerals are employed to designate like parts throughout the same,—

Figure 1:
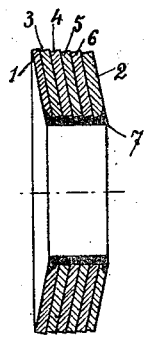
Fig. 1 is a cross section through the preferred form of my invention.
Figure 2:
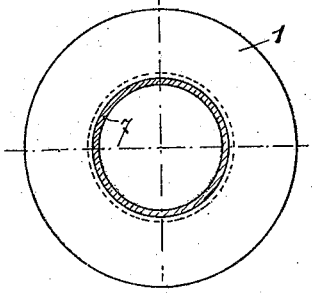
Fig. 2 shows a section taken between two of the plates shown in Fig. 1.

In Figs. 1 and 2, the numerals 1, 2, 3, 4, 5 and 6 designate a series of spring or elastic plates in juxtaposed relation one within another, having alined central bores through which extends a tube 7. The outer plates 1 and 2 have beveled faces adjacent their bores to receive the riveted or headed ends of the tube 7 and thus the tube ends will be flush with the outer surface of the plates.

By the juxtaposition of several spring plates the stresses if the plates are arranged within each other may be added together and the deflections may be added together if they are placed symmetrically in pairs.

The plates forming the washers are thin, and there are several of them in order to obtain both the necessary pressure for preventing unscrewing and sufficient convexity for ensuring continuation of the said pressure when play takes place between the parts to be secured, either owing to elastic or to permanent deformation.

In use, the washer, or more than one, is placed under a nut or bolt head. Upon tightening the nut or bolt, the spring washer or washers are flattened and thus give the appearance of an ordinary washer. The nut is then heavily pressed against the faces of the screw threads and the pressure will continue even if the nut becomes slightly loose.

Having thus described my invention, I claim:—

A locking washer comprising a series of conical elastic plates destined to be placed under a nut to prevent the unscrewing the same, said plates being engaged one in the other and centered on a sleeve having flanges engaging the beveled faces of the outermost plates.

In witness whereof I affix my signature.

PAUL AIMÉ TREPIER.